(12) United States Patent
Spitzer

(10) Patent No.: US 7,843,403 B2
(45) Date of Patent: Nov. 30, 2010

(54) COMPACT, HEAD-MOUNTABLE DISPLAY DEVICE WITH SUSPENDED EYEPIECE ASSEMBLY

(75) Inventor: Mark B. Spitzer, Sharon, MA (US)

(73) Assignee: Myvu Corporation, Westwood, MA (US)

( * ) Notice: Subject to any disclaimer, the term of this patent is extended or adjusted under 35 U.S.C. 154(b) by 909 days.

(21) Appl. No.: 11/644,781

(22) Filed: Dec. 22, 2006

(65) Prior Publication Data

US 2007/0103388 A1 May 10, 2007

Related U.S. Application Data

(62) Division of application No. 09/589,299, filed on Jun. 7, 2000, now Pat. No. 7,158,096.

(60) Provisional application No. 60/140,340, filed on Jun. 21, 1999, provisional application No. 60/140,707, filed on Jun. 24, 1999.

(51) Int. Cl.
*G09G 5/00* (2006.01)
(52) U.S. Cl. .............................. 345/7; 359/630; 348/42
(58) Field of Classification Search ..................... 345/7, 345/8, 1.1–1.3; 359/630; 715/856; 348/42–60
See application file for complete search history.

(56) References Cited

U.S. PATENT DOCUMENTS

| | | | | |
|---|---|---|---|---|
| 6,124,843 A * | 9/2000 | Kodama | ..................... | 715/856 |
| 6,181,304 B1 * | 1/2001 | Robinson et al. | ............... | 345/8 |
| 6,400,341 B1 * | 6/2002 | Maeda et al. | ................... | 345/8 |
| 6,762,885 B1 * | 7/2004 | Ogasawara et al. | ......... | 359/630 |
| 7,158,096 B1 * | 1/2007 | Spitzer | ......................... | 345/8 |
| 2002/0003508 A1 * | 1/2002 | Schehrer et al. | ................ | 345/7 |
| 2003/0030912 A1 * | 2/2003 | Gleckman et al. | ............ | 359/633 |
| 2008/0122736 A1 * | 5/2008 | Ronzani et al. | ................ | 345/8 |

* cited by examiner

*Primary Examiner*—Nitin Patel
(74) *Attorney, Agent, or Firm*—Weingarten, Schurgin, Gagnebin & Lebovici LLP

(57) ABSTRACT

A compact, lightweight, head-mountable display device is provided for transmitting an image to a user's eye. The device includes a projection system including a display attached at one end to a head-mountable support fixture. An eyepiece assembly is attached to a second end of the support fixture. The support fixture maintains the projection system and the eyepiece assembly in alignment along an optical path through free space between the projection system and the eyepiece assembly, with the projection system disposed to transmit the image on the optical path and the eyepiece assembly disposed to receive the image from the projection system and to direct the image to the user's eye.

18 Claims, 6 Drawing Sheets

COMPACT, HEAD-MOUNTABLE DISPLAY DEVICE WITH SUSPENDED EYEPIECE ASSEMBLY

CROSS REFERENCE TO RELATED APPLICATIONS

Applicant claims priority under 35 U.S.C. §119(e) of U.S. Provisional Application No. 60/140,340, filed Jun. 21, 1999, entitled "Light Weight, Compact Eyepiece on a Post," and No. 60/140,707, filed on Jun. 24, 1999, entitled "Light Weight, Compact Eyepiece on A Post," the disclosures of which are incorporated by reference herein.

This application is a divisional application under 35 U.S.C. §120 of U.S. patent application Ser. No. 09/589,299, filed Jun. 7, 2000, now U.S. Pat. No. 7,158,096 the disclosure of which is incorporated by reference herein.

STATEMENT REGARDING FEDERALLY SPONSORED RESEARCH OR DEVELOPMENT

N/A

BACKGROUND OF THE INVENTION

There are many examples of displays mounted on the head, sunglasses, eyeglasses and the like (for example Perera, U.S. Pat. No. 4,867,551). Perera describes a display mounted on eyeglasses, the limitation of which is the high degree of occlusion of the user's field of view beyond the display, and the use of non-axial optics, which introduces distortion. Other companies, such as VirtualVision, provide displays that are suspended by a cable, gooseneck fixture or other mechanical support in front of one or both of the user's eyes. Similarly, students at the MIT Media Laboratory have been mounting displays from Reflection Technology on eyewear, in order to provide a computer display in a mobile fashion. These approaches also highly limit the user's view of the surroundings.

Generally, head-mounted and helmet-mounted display systems are based on miniature displays having a diagonal dimension of 4 cm or less. The display systems that use such miniature displays must provide a lens near the eye for magnification, and to make possible comfortable viewing at near distances. We term the lens and any other associated optics that must be placed near the eye the "eyepiece." Most prior art head-mounted systems also place the display (for example a miniature liquid crystal flat panel display) near the eye as well, which requires both a support fixture for the eyepiece, and a conduit for electrical cables to the display. These components (wires, liquid crystal display, illumination source and any other required circuits) are placed within an opaque housing near the eye. Consequently, such systems block a portion of the user's visual field, and also obscure the user's face. For liquid crystal displays, the illumination source accounts for a large amount of the volume of the eyepiece.

In a recent patent (U.S. Pat. No. 6,023,372) we described a method of supporting an eyepiece near the eye at the end of a transparent opto-mechanical structure 10 (FIG. 1). Data or images are relayed to the device by a cable which may comprise wire, one or more optical fibers as described in U.S. Pat. No. 5,715,337, or a fiber optic coherent bundle image conduit. The advantage of this prior art approach is the low obscuration of the user's vision inherent in the use of a transparent opto-mechanical support for the eyepiece. A limitation is the additional weight of the clear optical supporting section.

In U.S. Pat. No. 6,057,966, Carroll describes the use of off-axis projection to an eyepiece (a parabolic mirror) suspended in front of a user's eye on a post. This approach, and others like it, suffers from distortion resulting from the off-axis design.

SUMMARY OF THE INVENTION

The present invention provides a light weight, compact head-mountable display device that combines an image relay system and mechanical support with a simple mounting system that can be applied to eyeglasses or other head gear. The display device comprises suspending an eyepiece in front of the eye and transmitting by free space projection an image from an electronic display mounted near the temple. The device is also suitable as an interface to computers, personal digital assistants, and cellular telephones.

More particularly, the display device comprises a head-mountable support fixture comprising an elongated member having a first end and a second end. A projection system including a display operative to provide an image is attached to the first end of the support fixture. An eyepiece assembly is attached to the second end of the support fixture. The support fixture maintains the projection system and the eyepiece assembly in alignment along an optical path through free space between the projection system and the eyepiece assembly, with the projection system disposed to transmit the image on the optical path and the eyepiece assembly disposed to receive the image from the projection system and to direct the image to the user's eye.

This invention overcomes the limitations of the previous eyepiece approaches by employing designs that reduce off-axis distortion. These approaches also permit reduction of weight by reducing the number of optical elements needed for distortion correction. In one preferred embodiment of this invention, a display mounted near the temple of a user, combined with a magnifying eyepiece suspended in front of the eye of the user makes viewing of the image on the display possible without the weight of a transparent mechanical support. The eyepiece may be of the see-around type or the see-through type. The use of free-space projection to the eyepiece reduces the weight and cost of the system. Since the system in this embodiment is axial, no non-axial aberration is introduced.

In a second preferred embodiment, the eyepiece utilizes a form of Mangin mirror, which, through its refractive properties, reduces the angle of incidence on the focusing surface of the mirror. The display and projection optics are located near the temple of the user, and the image is relayed through free space to the mirror. The mirror itself is suspended by a wire or other fixture. The weight and cost of the system are reduced over the prior art, and the aberration from off-axis projection is reduced by the modified Mangin mirror.

DESCRIPTION OF THE DRAWINGS

The invention will be more fully understood from the following detailed description taken in conjunction with the accompanying drawings in which.

DETAILED DESCRIPTION OF THE INVENTION

Figure 1:
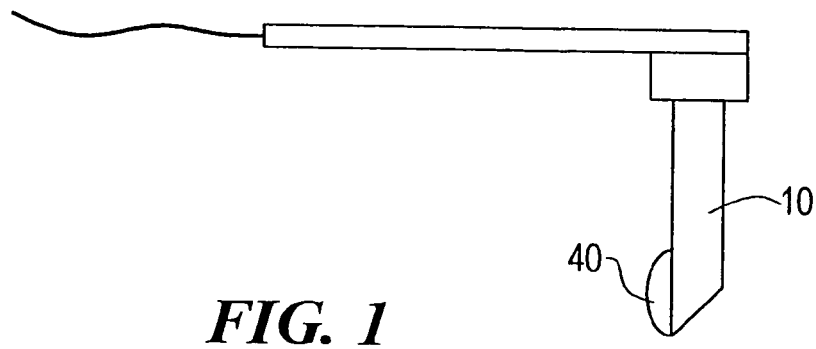
FIG. 1 is a schematic illustration of a prior art display device.
Figure 2:
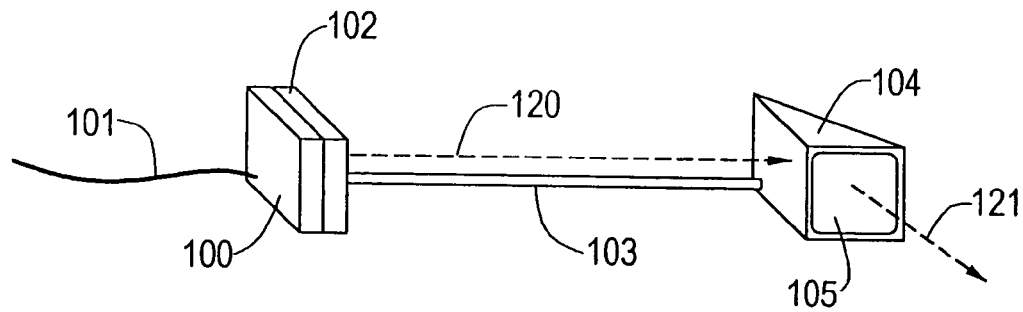
FIG. 2 is a schematic illustration of a display device according to the present invention.

A first embodiment of the invention is shown in FIG. 2. Signals are conveyed by cable 101 to a projection system having a display 102, which may be an electroluminescent display, a liquid crystal display (LCD), a field emission display, a cathode ray tube, or other miniature display. If the display is a transmissive LCD, of the type manufactured by Kopin Corporation, of Taunton, Mass., it is provided with a backlight 100. In such a case rays from the backlight illuminate the backside of display 102 and emerge from the front after having been modulated to form an image. In the case of an emissive display, such as an active matrix electroluminescent display of the type manufactured by Planar Corporation, Beaverton, Oreg., no backlight is required.

Referring to FIG. 2, a ray 120 emerges from the display 102 and propagates on an optical path to a eyepiece assembly 104. The eyepiece assembly is suspended at one end of a support fixture 103. The support fixture 103 is attached to the display 102 at the other end. In most of the drawings, only a single ray is shown to make the exposition clear, but it should be understood that the functioning of the invention requires a plurality of rays and optical paths. It should also be understood that when single lens surfaces are shown, they may represent a system of multiple lens surfaces. Additionally, for the exposition of the optical principles, only the essential optical elements are shown, but it is to be understood that the associated housings, clamps and circuits that may or may not be shown can be applied to any of the optical designs.

Light is transmitted through free space to the eyepiece assembly 104 suspended in front of the eye of the user. The support fixture is located so that it does not occlude light on the optical path through free space. The support fixture may be any suitable mechanical element, such as a thin rod or post, as shown in FIG. 2, or a plate.

Figure 3:
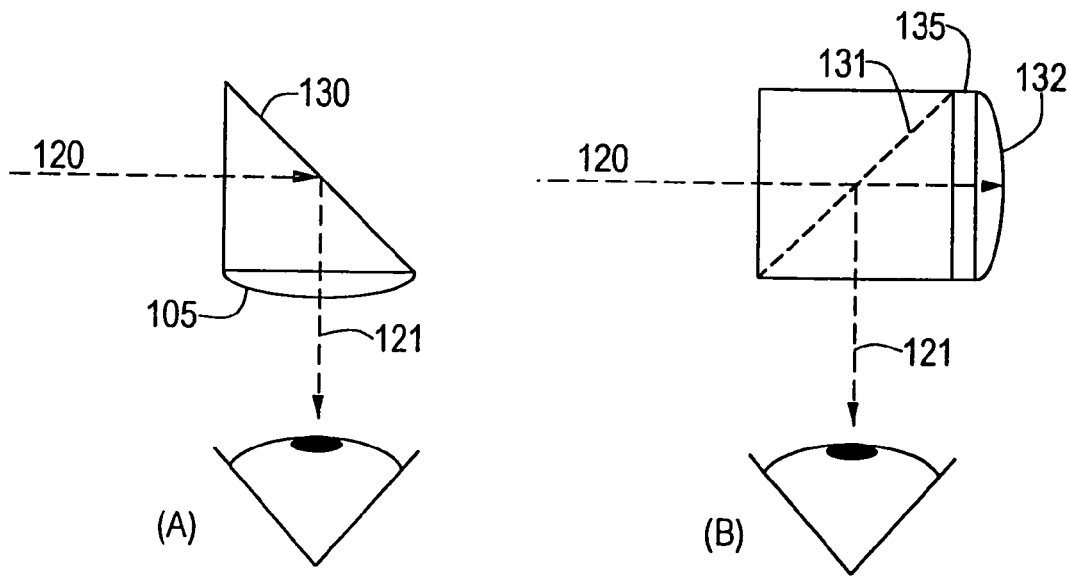
FIG. 3A is a schematic illustration of an eyepiece assembly for use in the display device of the present invention.
FIG. 3B is a schematic illustration of a further eyepiece assembly for use in the display device of the present invention.

FIG. 3A illustrates a simple occluding or "see-around" eyepiece assembly design, in which light is reflected by mirror 130 through lens 105 to the user's eye, as indicated by ray 121. FIG. 3B illustrates a non-occluding, or "see-through" design, in which one linear polarization of the light ray 120 passes a polarization beam splitting coating 131 and is incident on mirror 132, after having also passed through quarter wave plate 135. The reflected ray then passes again through quarter wave plate 135 and is rotated to a state in which it is reflected by the polarization beam splitting coating 131, toward the user's eye, as indicated by ray 121. In both cases, if the focal length of the eyepiece assembly is equal to the optical distance between the eyepiece assembly and the display 102, then the user perceives an image at infinity. Adjustment of the distance between the eyepiece assembly and the display can be made to change the position of the virtual image and in this way provide a focus adjustment. The lens 105 may be spherical or aspherical and may also comprise a plurality of lens elements including achromats, gradient index lenses, diffractive lenses or holograms. If a mirror is used, it may take a spherical, aspherical, parabolic or other shape.

Figure 4:
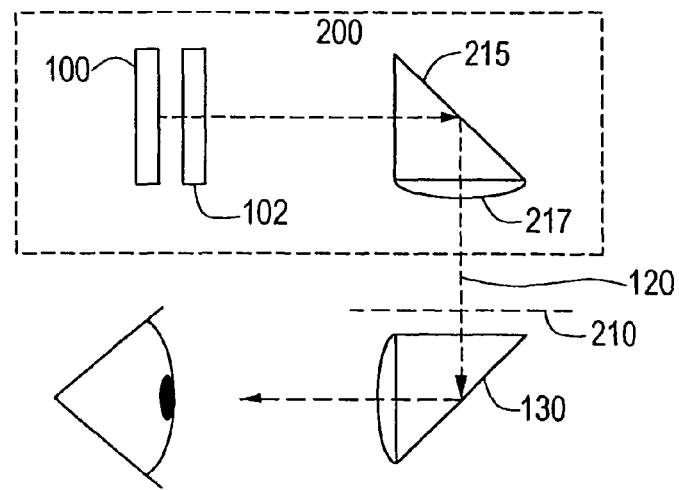
FIG. 4 is a further embodiment of a display device of the present invention.

The optical design may involve formation of an intermediate image plane, as shown in FIG. 4. In this case, light from backlight 100 passes through display 102 and then is folded by mirror 215. This fold wraps the optical path around the temple of the user. The light passes through lens system 217 that creates an intermediate image plane 210, which is viewed by the eyepiece assembly as previously described. The optical projection system 200 shown in FIG. 4 may be housed in injection-molded plastic parts by methods known in the art. The suspension of the eyepiece assembly can be made by any number of methods including use of plastic or metal based supports.

Figure 5:
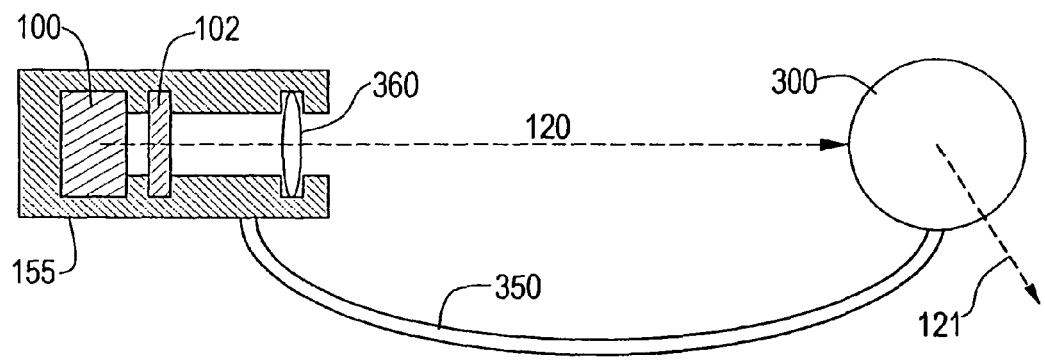
FIG. 5 is a still further embodiment of a display device of the present invention.

FIG. 5 illustrates another example of the first embodiment, in which the projection optics are located in a housing 155, which also contains a backlight 100, display 102, and a lens 360. A mechanical support 350 suspends a further housing and optics unit 300, which contains the eyepiece optics. The unit 300 may be in the shape of a sphere, which has optical, aesthetic and safety advantages. The optical advantages relate to the use of the exterior and interior surfaces for magnification and/or aberration correction. The aesthetic advantage relates to the creation of a sphere that can provide an attractive look. The safety advantage arises because a curved housing has no sharp edges and accidental impact with the face or eye is not unusually threatening to health or vision.

Figure 6:
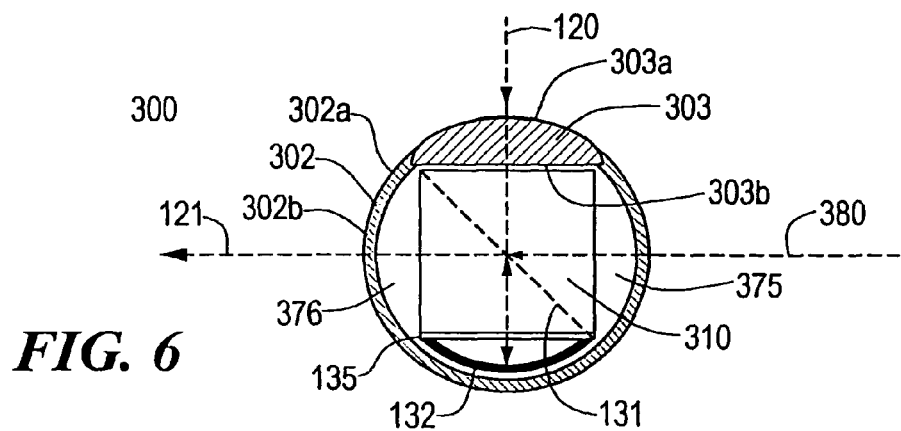
FIG. 6 is a further embodiment of an eyepiece assembly for use in the display device of the present invention.

FIG. 6 illustrates one possible internal structure of the unit 300 described above. A hollow, transparent sphere 302 having an external surface 302a and an internal surface 302b is mounted at the top of a support post 350 (FIG. 5), which may be curved as shown to support the sphere 302 from the bottom. Light rays 120 from the projection system are incident on surface 302a and propagate to a lens 303 having a first surface 303a and a second surface 303b. The curvature of the surfaces 303a and 303b affect the vergence of the light, which propagates into a beam splitting cube 310, having a polarization beam splitter interface coating 131. Alternatively, a beam splitting plate may also be used. Light of the appropriate linear polarization passes interface 131, propagates through quarter wave plate 135 and reflects from surface 132. The light returns through the quarter wave plate and reflects from the interface 131 toward the eye of the user, as shown by ray 121 propagating to the eye. The curvature of surfaces 303a and 303b, and mirror 132 are selected for the desired magnification and aberration correction. Light from the ambient scene, indicated by ray 380, may pass through the eyepiece with little or no change in vergence. In a similar non-see-through embodiment, the internal surface curvature of inside surface 302b of spherical housing 302 may be adjusted to modify light exiting the cube 310, so as to form a meniscus or other type of lens. These additional surfaces can be used for further correction of aberrations or for magnification. The inside surface 302b need not be spherical and can be an asphere or other complex shape. Alternatively, additional lenses may be added in spaces 375 and 376 if desired.

The hollow sphere 302 may be made of optical grade acrylic, polycarbonate resin, or other optical material. Such spheres can be manufactured by injection molding or other techniques known in the art, in two pieces that are joined with optical cement after the internal optics are installed. If the wall thickness of the sphere is sufficiently thin (on the order of 1 mm), the sphere will transmit ambient light without adding significant optical power. Lens 303 and other lenses inserted within 302 may be formed of plastic or glass. The amount of refraction may be adjusted by selecting a material with a particular index of refraction, in the range of 1.4 to 2.0, or by changing the curvature of the surfaces. After the unit 300 is assembled, it may be coated with a scratch resistant hard coating and additionally with an antireflection coating (for example magnesium fluoride). The unit 300 may be decorated, provided the optical surfaces are not affected.

It should also be recognized that the eyepiece can be formed by any number of combinations of refractive, diffractive and reflective optical elements, polarizing or non-polarizing beam splitters, or any other methods known in the art for creating axial optical systems.

Figure 7:
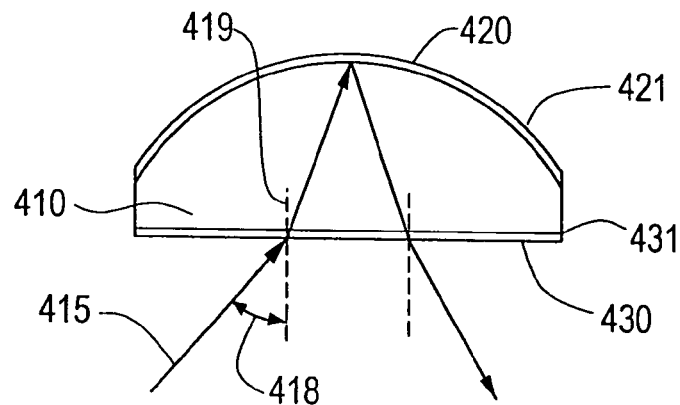
FIG. 7 is a still further embodiment of an eyepiece assembly for use in the display device of the present invention.

The second preferred embodiment of this invention involves a non-axial optical approach, in which a form of Mangin mirror is used to reduce the angle of incidence on an eyepiece mirror, leading to a reduction in off-axis aberrations. Referring to FIG. 7, a modified Mangin mirror is formed from a solid optical material 410 having an index of refraction in the range of 1.5 to 4.0. A first surface 420 of the mirror is shaped to be spherical, aspherical, parabolic, or another suitable shape, and the second surface 430 may be similarly shaped or flat. The shaped surface 420 is provided with a reflective coating 421, for example a vacuum deposited thin film of aluminum, and the second surface is provided with an antireflection coating 431, for example a vacuum deposited coating of magnesium fluoride. A light ray 415 incident on surface 430 at an angle of 418 is refracted to the angle 419 as it propagates into material 410 in accordance with Snell's law. As examples, consider a mirror made from $LaSFN_9$, a material with an index of refraction of 1.85. If the angle of incidence is for example 45 degrees, the angle of refraction is 22.5 degrees. In the case of the use of diamond, in which the index of refraction is approximately 3.8, the angle of refraction is 10.7 degrees. Thus, light is incident and reflected from the modified Mangin mirror at 45 degrees, creating a 90 degree turn, yet the angle from the normal to the surface of the mirror surface 420 is only 10.7 degrees (for the case of diamond).

Figure 8:
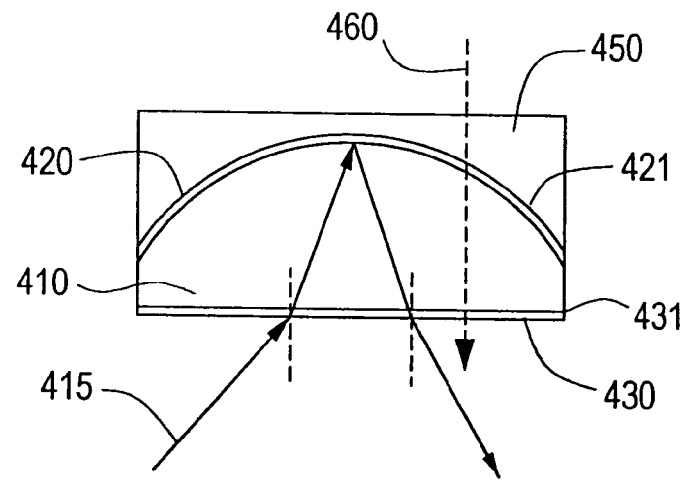
FIG. 8 is a further embodiment of the eyepiece assembly of FIG. 7.

The material 421 used for accomplishing the reflection from the shaped surface may be metal, vacuum-deposited dielectric coatings, or holographic coatings. The back surface may be painted for protection. A see-through device may be attained by using a partially transmitting coating on surface 420, and by adding a section 450 to reduce refraction at the curved surface 420, as shown in FIG. 8. In such a case ray 460 may transit the mirror without refraction.

Figure 9:
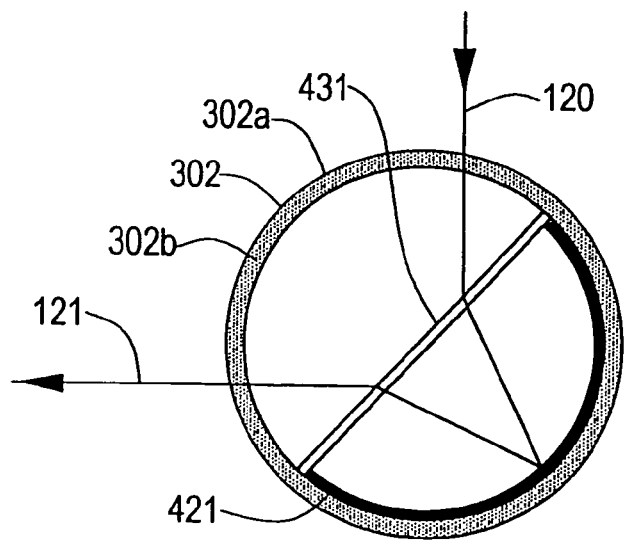
FIG. 9 is a still further embodiment of the eyepiece assembly of FIG. 7.

FIG. 9 illustrates a mirror of this type embedded in a spherical housing. In all of the embodiments described herein, various additional lenses may be added for correction of chromatic or other aberrations by techniques well known in the art.

Figure 10:
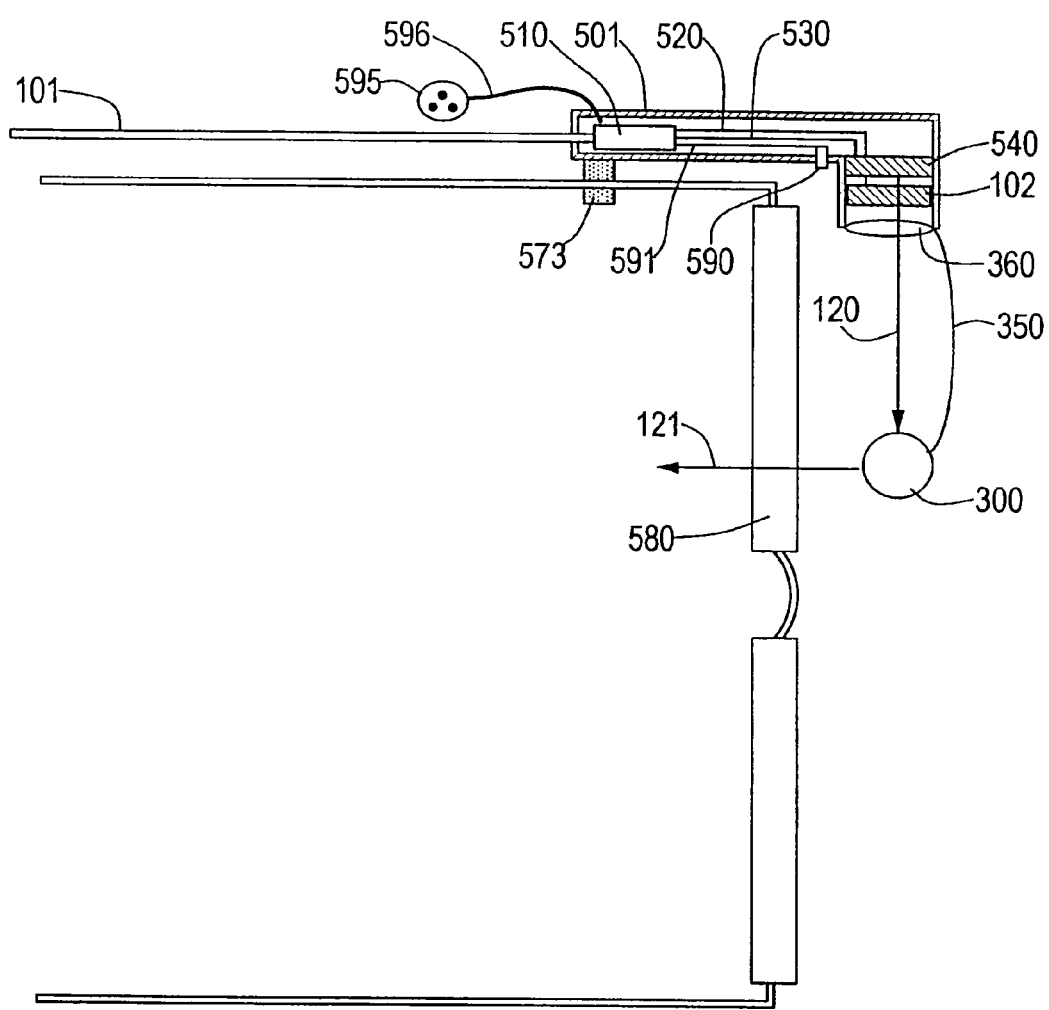
FIG. 10 is a schematic illustration of the display device of the present invention fixed to spectacle frames.

The devices shown in the foregoing figures are intended to be mounted in front of an eye of the user by fixtures mounted to spectacle frames or to headbands. Two units can be used for viewing by two eyes. FIG. 10 shows a complete illustration of a monocular system in accordance with this invention, intended for spectacle mounting in front of eyeglass lens 580. Signals are supplied to the unit by cable 101 that is anchored to housing 501. The housing 501 may contain circuit 510 that comprises termination points for cable 101, and may additionally comprise discrete or integrated circuits for controlling the display, illumination, or audio functions. Circuit 510 is connected to the display by wires 520. A second set of wires 530 delivers power to LEDs 540. It should be recognized that wires may be replaced by Kapton flex circuitry, coaxial cables, twisted pairs, or other conductors known in the art. Illumination from LEDs 540 passes through display 102 and is modulated in accordance with signals from circuit 510 to form an image. Rays 120 from the image are relayed by lens system 360 to unit 300, which is held in optical alignment by support fixture 350. Rays 121 are transmitted to the user's eye. A clamp 573 or any other suitable mounting device fixes the unit to the temple of the spectacle frames. An optional microphone 590 in communication with circuit 510 by wires 591 can be employed for audio input. Alternatively, a boom microphone (not shown) may be used. As a further alternative, microphone 590 may be included in unused space in unit 300 to move the microphone closer to the user's mouth, provided that the wires 591 are routed within or upon support fixture 350. An optional earpiece 595 in communication with circuit 510 through wires 596 may be employed for audio output.

Figure 11:
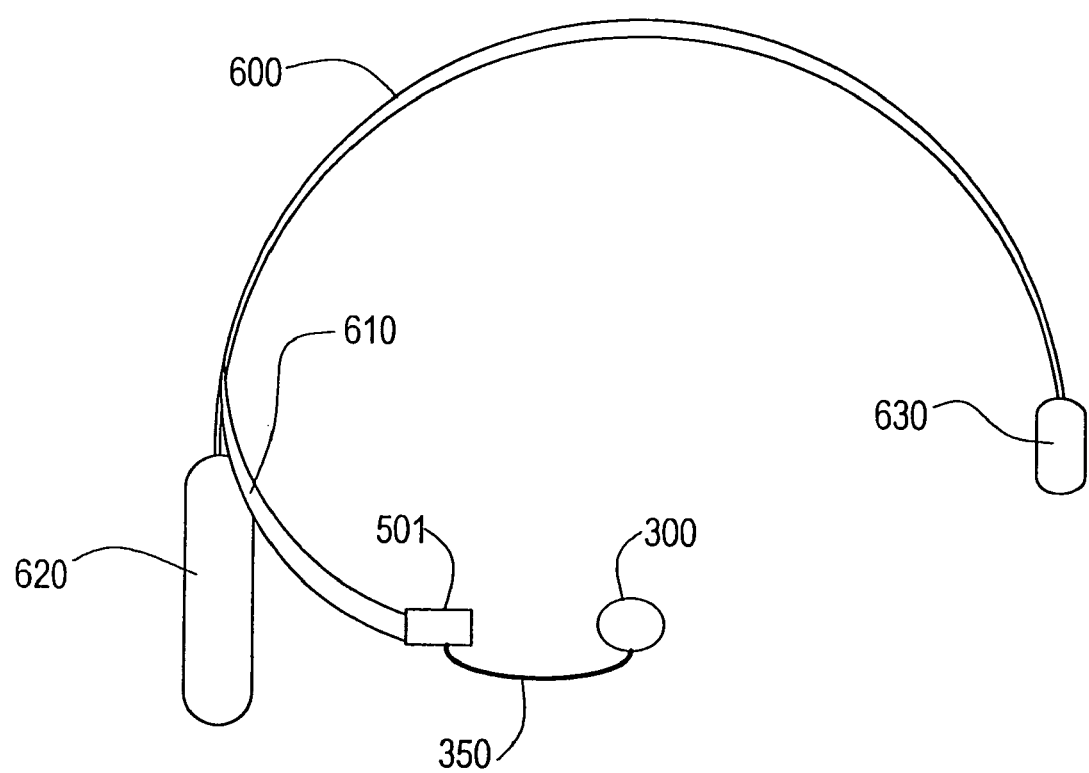
FIG. 11 is a schematic illustration of the display device of the present invention fixed to a headband.

Alternatively, as shown in FIG. 11, the display unit may be mounted on a boom 610 that is attached to a headband 600. The headband may also be fitted with an earpiece 620 for audio output. The boom may be provided with a microphone for audio input. The boom may also be provided with articulation points to enable the adjustment of the position of the eyepiece within unit 300. A pad 630 may be attached to the headband, or may be replaced with an earpiece for stereo audio.

Figure 12:
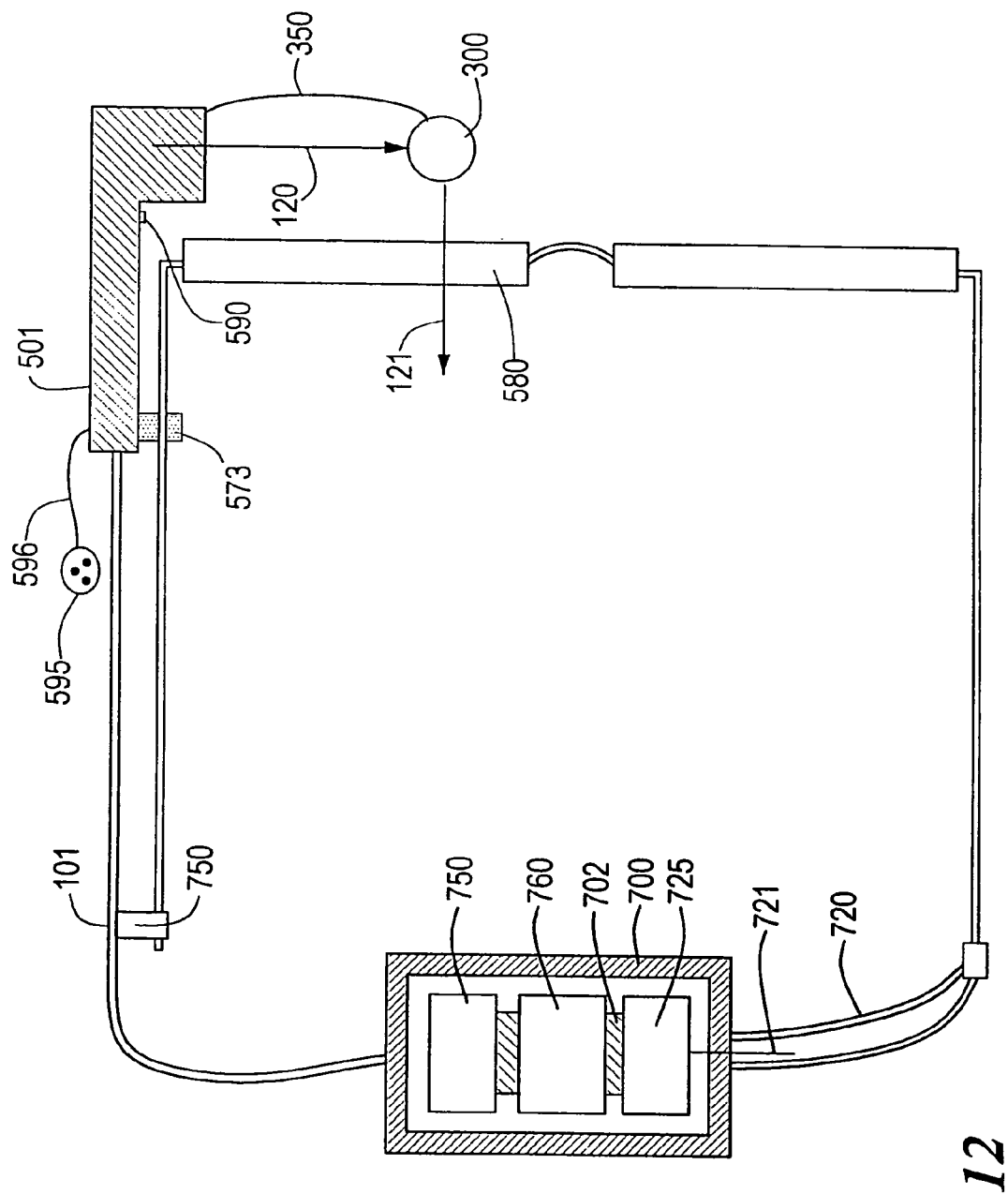
FIG. 12 is a schematic illustration of the display device of the present invention as an interface to a cellular telephone, computer, or personal digital assistant.

As previously described, the display and illumination system may be provided with an earpiece and microphone and in this way may serve as an interface to a cellular telephone, computer, or personal digital assistant. FIG. 12 illustrates such a system that communicates by radio frequency (RF) with a computing device or communication device. The RF circuit that enables the communication with the external circuit is located in a housing 700 worn by the user at the back of the head or elsewhere as the user sees fit. The spectacles and housing are stabilized by cable 101 and by cable 720. These cables may be integrated with textile covers and conventional tensioning devices used for head straps. Cable 720 contains an antenna 721 for RF circuit 725 so that the RF circuit may be in communication with an external device. Housing 700 also contains batteries 760 and a circuit 750 for compressing, decompressing, storing, and manipulating data. Circuit 750 also provides data and signals to the display and audio devices. Circuits 750, 760, and 725 are in communication by circuit 702 which may be a printed circuit board, multichip module substrate, Kapton flex circuit or other equivalent. This invention also anticipates the integration of these circuits in one integrated circuit that may be located in housing 700 or alternatively in housing 501.

The RF circuit may comprise one of any number of commercial digital or analog RF devices including for example the Bluetooth interface developed by Ericsson and its partners. The RF circuit provides communication with a cellular telephone, computer or other electronic device. Note that in some applications, the cellular telephone itself may be incorporated within unit 700 or even within the housing 501. Although this diagram shows the unit mounted to a spectacle frame by clamp 573, a similar device may be constructed for the headset shown in FIG. 11.

The invention is not to be limited by what has been particularly shown and described, except as indicated by the appended claims.

What is claimed is:

1. A compact display device for transmitting an image to a user's eye, the display device comprising:
    a head-mountable support fixture comprising an elongated member having a first end and a second end;
    a projection system including a display operative to provide an image, the support fixture attached at the first end to the projection system; and
    an eyepiece assembly attached to the second end of the support fixture;
    wherein the support fixture maintains the projection system and the eyepiece assembly in alignment along an optical path through free space between the projection system and the eyepiece assembly, with the projection system disposed to transmit the image on the optical path and the eyepiece assembly disposed to receive the image from the projection system and to direct the image to the user's eye; and
    wherein the eyepiece assembly comprises a non-axial optical system including a modified Mangin mirror comprising a solid optical material having an external entrance and exit surface and an internal reflective surface, the material arranged and having an index of refraction selected so that light from the projection system incident on the external surface is refracted as the light propagates into the material and light within the material is reflected off the internal reflective surface and is refracted at the external surface as the light exits the material, whereby off-axis aberrations are reduced.

2. The device of claim 1, wherein the reflective surface comprises a metal, a vacuum-deposited dielectric coating, or a holographic coating.

3. The device of claim 1, wherein the reflective surface is spherical or aspherical.

4. The device of claim 1, wherein the reflective surface is a paraboloid.

5. The device of claim 1, wherein the reflective surface is partially transmitting and the eyepiece assembly further includes a section adjacent the reflective surface selected to reduce refraction of ambient light passing through the reflective surface into the solid optical material.

6. The device of claim 1, wherein the solid optical material is housed within a curved housing.

7. The device of claim 1, wherein the solid optical material is housed within a spherical housing.

8. The device of claim 1, further comprising a housing, the projection system disposed within the housing, circuits and wiring in electrical communication with the projection system disposed within the housing, and the support fixture attached to the housing.

9. The device of claim 8, further comprising a mounting device configured to mount the housing to spectacle frames or a headband.

10. The device of claim 8, further including a microphone supported by the housing.

11. The device of claim 10, wherein the microphone is mounted on a boom.

12. The device of claim 8, further including an earpiece supported by the housing and operative to transmit audio output signals.

13. The device of claim 8, further comprising a boom attached to a headband, the housing attached to the boom.

14. The device of claim 13, further comprising a microphone supported by the headband.

15. The device of claim 13, further comprising an earpiece supported by the headband and operative to transmit audio output signals.

16. A cellular telephone in communication with the display device of claim 1.

17. A computer in communication with the display device of claim 1.

18. A personal digital assistant in communication with the display device of claim 1.

* * * * *